April 21, 1970 J. E. UNRUE, JR 3,508,017

ADAPTIVE ECHO CANCELLER WITH AN OUTPUT FILTER

Filed Dec. 8, 1967 3 Sheets-Sheet 1

INVENTOR
J. E. UNRUE, JR.
BY Daniel D. Dubosky
ATTORNEY

ADAPTIVE ECHO CANCELLER WITH AN OUTPUT FILTER

Filed Dec. 8, 1967

United States Patent Office 3,508,017
Patented Apr. 21, 1970

3,508,017
ADAPTIVE ECHO CANCELLER WITH AN OUTPUT FILTER

John E. Unrue, Jr., Freehold, N.J., assignor to Bell Telephone Laboratories, Incorporated, Murray Hill and Berkeley Heights, N.J., a corporation of New York
Filed Dec. 8, 1967, Ser. No. 689,056
Int. Cl. H04b *3/20*
U.S. Cl. 179—170.2 10 Claims

ABSTRACT OF THE DISCLOSURE

An adaptive echo canceller utilizing a transversal filter type signal processing network is connected into each one of the two one-way transmission paths in a four-wire communications system. The power spectrum of the residual echo which remains after cancellation is concentrated at the edges of the frequency pass band of the transmission paths. In response to receiving an echo-producing signal at an echo canceller location, a speech detector associated with the echo canceller causes a filter having high attenuation at the band edges to be inserted after its respective echo canceller in order to reduce the level of the residual echo.

BACKGROUND OF THE INVENTION

This invention relates to the suppression of echoes in communication channels and more particularly to the effective suppression of echoes in a two-way communications system of extremely long length such as, for example, a system completed by way of a satellite repeater in orbit about the earth. Its principal object is to afford improved protection against echoes.

An echo occurs in a communications system when an electrical signal meets an imperfectly matched impedance junction such as a hybrid network, and the signal is partially reflected back to the signal source. Because signals in the communications system require a finite travel time, the reflected signal, or echo, is heard some time after the speech is transmitted. As distances increase, the echo takes longer to reach the talker and becomes more and more annoying. An attempt is therefore generally made to control these echoes with voice-operated devices, known as echo suppressors, which function to attenuate or disable the transmittance of the voice path in one direction when a signal is detected in the path going in the other direction.

For circuits with moderate delays, such as terrestrial transcontinental communication channels, the delay is of the order of several tens of milliseconds. This is sufficient to produce noticeable separation in the form of audible echoes which would, if uncontrolled, adversely affect the efficiency of verbal communication. Echo suppressors have been developed which adequately cope with such echoes. For satellite communication circuits, on the other hand, the delay may be of the order of several hundred milliseconds, depending upon the height of the satellite, the number of satellites involved, and so on.

In a conversation carried on over a system with the larger delay, it has been found that there is a tendency for one talker to anticipate another talker's response and to break in on the conversation without his realizing that he is doing so. Typically, he breaks in to repeat the previously transmitted utterance or to question its receipt by the other party, and he does so during the time that the delayed answer is being transmitted.

The simultaneous presence of speech signals in both transmission paths at the echo suppressor location results in a dilemma which can have either one of two possible outcomes. Either the disabled transmission path is restored, allowing the echo to be returned, or the transmission path remains disabled, thereby preventing the speech of one party to the conversation from reaching the other party. The latter event gives rise to degradation known in the art as "chopping" or "clipping." Degradation results, regardless of the action taken by the echo suppressor, during these periods of simultaneous utterances from the two parties. It is found that the frequency of such periods increases as the delay of the circuit increases, resulting in a deterioration of circuit quality.

For these long delay systems, a new apparatus called an adaptive echo canceller has been proposed to eliminate echoes by a process of cancellation and at the same time to permit transmission in both directions. The operation of an adaptive echo canceller has been described in "An Adaptive Echo Canceller" by M. M. Sondhi, The Bell System Technical Journal, vol. XLVI, page 497, March 1967. Briefly, a network within the echo canceller synthesizes a replica of the echo signal by processing the incoming signal in the one-way transmission path leading to the four-wire to two-wire circuit junction commonly called a hybrid. The outgoing one-way transmission path from the hybrid is connected to one input of a difference amplifier, the other input of which is connected to receive the synthesized replica of the echo signal. The output of the difference amplifier is connected through an error signal control circuit to the synthesizing network, thereby establishing a feedback loop which adapts to the transmission characteristics of the echo path and tracks variations of that path that may occur during a conversation.

In one type of echo canceller, a self-adjusting transversal filter is supplied with signals incoming to a four-wire to two-wire junction. Error signals, derived by processing signals in the outgoing path, continuously control the adjustment of the transversal filter so that the transversal filter produces a replica of the undesired echo at its output. The replica signal is thereupon substracted from the outgoing signals and the difference is used as a new error signal for controlling the transversal filter.

The degree to which this transversal filter type echo canceller is able to suppress the undesired echo is dependent on the number of delay line taps available and utilized in the transversal filter. With a finite number of taps total suppression is not possible. An infinite number of taps is of course impossible, and even an extremely large number of taps is both impractical and economically prohibitive since the additional circuits associated with each additional tap add considerable cost to the total echo canceller.

SUMMARY OF THE INVENTION

The primary object of the present invention is to reduce the level of the residual echo obtained at the output of a transversal filter type echo canceller with a limited number of taps.

The power spectrum of the residual echo from a transversal filter type echo canceller has been determined to be concentrated at the edges of the pass band of the four-wire transmission system. In accordance with the present invention, this residual echo is further suppressed by a filter inserted into the outgoing transmission path of the echo canceller in response to incoming speech from the far end subscriber. The filter is designed to present high attenuation at the edges of the pass band of the four-wire transmission system with a minimum amount of attenuation between the band edges. As a result, the echo signal is further suppressed, and the near end subscriber is permitted to talk under the condition commonly referred to as double talking with only a minimum amount of degradation due to the decreased bandwidth.

BRIEF DESCRIPTION OF THE DRAWING

The invention will be more fully understood when the following detailed description is read in conjunction with the drawing in which.

DETAILED DESCRIPTION

Figure 1:
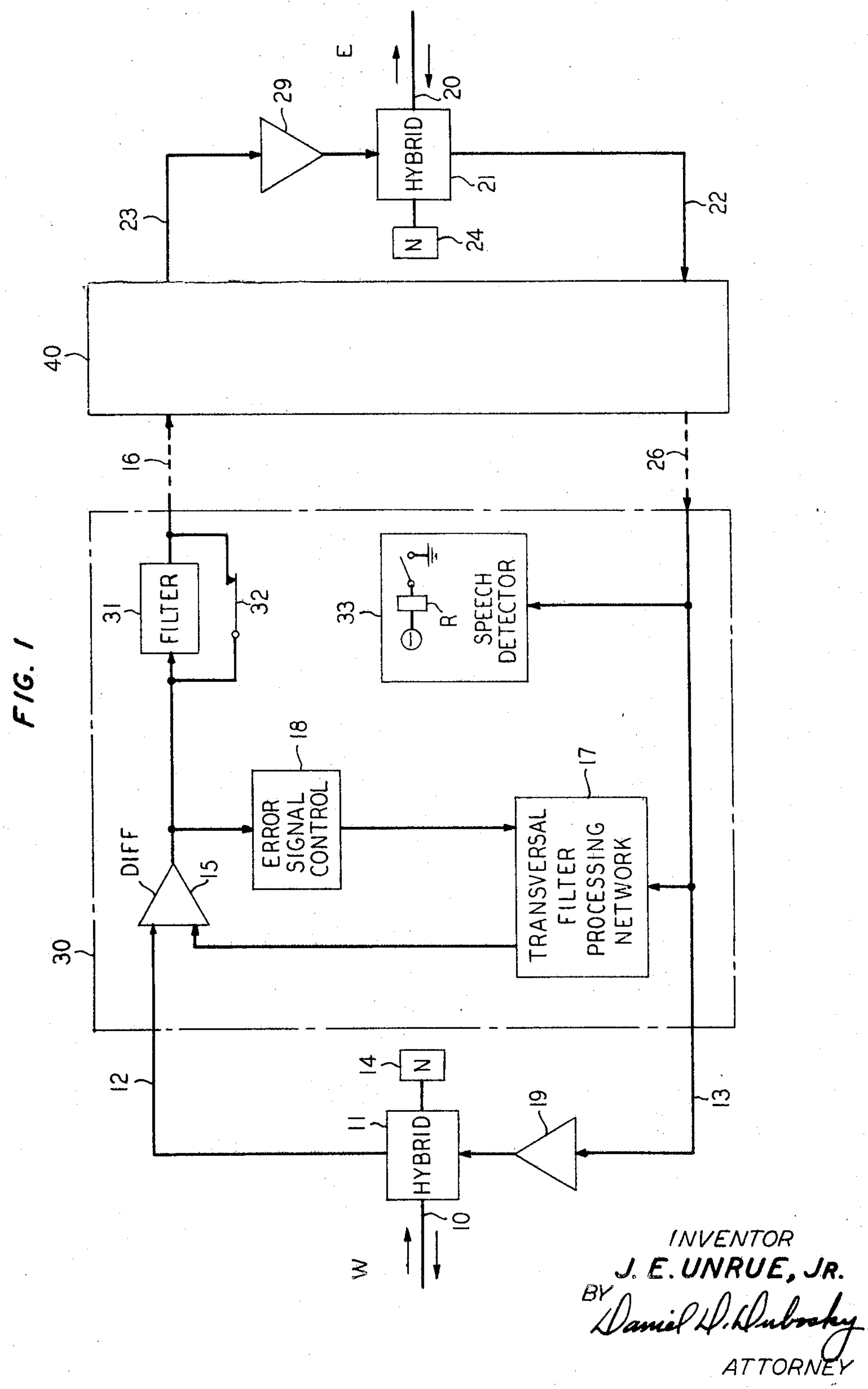
FIG. 1 is a block schematic diagram showing a two-way signal transmission system which utilizes echo cancelling apparatus constructed in accordance with the present invention.

FIG. 1 illustrates by way of a greatly simplified diagram, a signal transmission system interconnecting two terminal stations designated respectively E (east) and W (west). Two-way transmission is carried out in the following manner. A local circuit 10, which typically is a conventional two-wire telephone circuit connecting a subscriber to station W, is connected by hybrid network 11 to one end of a four-wire system that includes two separate two-wire circuits 12 and 13. In well known fashion, the hybrid network provides a one-way path for voice signals from circuit 10 to outgoing circuit 12 and another one-way path for incoming signals from circuit 13 to local circuit 10. The impedance of the local circuit 10 is matched insofar as practical by a balancing network 14 associated with hybrid 11.

Outgoing signals in circuit 12 are passed by way of difference network 15 to the west-to-east transmission circuit 16 through a filter network 31 to be described hereinafter or through normally closed by-pass switch 32. Circuit 16 typically includes both traditional telephone links, and circuits completed by way of one or more earth satellites. At the east station, signals from circuit 16 are coupled through echo cancelling apparatus 40 (identical to echo cancelling apparatus 30 to be described hereinafter) and delivered by way of isolating amplifier 29 to hybrid network 21. Hybrid 21, which is terminated by network 24, transfers incoming signals from circuit 23 to subscriber circuit 20 and routes locally generated signals from circuit 20 to outgoing circuit 22. Output signals on circuit 22 are coupled through echo cancelling apparatus 40 to east-to-west transmission circuit 26, also generally including a satellite transmission link, to station W. Signals on circuit 26 received at station W are delivered by way of circuit 13, which includes isolating amplifier 19, to hybrid 11.

Ideally, all incoming signals on circuit 13 or circuit 23 are passed to the respective subscriber lines; none is transferred to the outgoing circuits 12 and 22. Unfortunately, the balancing networks generally provide only a partial match to the two-wire circuits (10 and 20), and a portion of the incoming signal reaches the outgoing circuit. In the absence of adequate suppression, this portion is returned to the remote station and is perceived as an echo. Accordingly, echo-cancelling apparatus is employed to eliminate the return signal without, however, interrupting either the incoming or the outgoing circuits.

In apparatus 30 associated with station W (identical apparatus 40 is employed at station E), transversal filter processing network 17 is supplied with signals incoming on circuit 13. It develops the requisite replica of the incoming signal to cancel that portion of the signal in circuit 12 which corresponds to a signal in circuit 13, i.e., an echo. The echo is thereupon cancelled by subtracting the replica signal from the signal in circuit 12 through the action of algebraic difference network 15.

Since the character of the echo signal changes with changes in the local two-wire circuit such as connection or disconnection of an extension telephone during a conversation, or transfer of calls via key telephones or PBX's, it is necessary to adjust processing network in accordance with the change. This adjustment is done through error signal control circuit 18 whose input is connected to the signal produced at the output of difference network 15 in order to determine the degree of echo present after the difference has been taken. Continuous adjustment assures rapid convergence of a match between the echo and the processed cancellation signal. If the tapped delay line utilized within transversal filter processing network 17 were infinite in length with an infinite number of taps, the match achieved would theoretically be a perfact one, that is a match with a complete cancellation of the echo. With a delay line having a finite length and finite number of taps, however, complete cancellation is not achieved and a residual echo remains at the output of difference network 15 even after the adjustment by control circuit 18 has been completed. It has been determined and will be shown hereinafter that the power spectrum of the residual echo is concentrated at the pass band edges of the one-way transmission circuits. In accordance with the present invention, a filter 31 having high attenuation at the band edges and a minimum amount of attenuation therebetween is connected between the output of difference network 15 and transmission circuit 16. When there is no incoming signal from transmission circuit 26, there will of course be no echo signal on circuit 12 and filter 31 is by-passed by a normally closed contact 32. Accordingly, speech signals generated on local circuit 10 are coupled to circuit 12 and permitted to pass to transmission circuit 16 unaffected by filter 31.

If, however, there is an incoming spech signal on transmission circuit 26, speech detector 33, whose input is connected to circuit 13, will detect the presence of the speech signal and in response thereto operate a relay R contained therein which in turn opens normally closed contact 32 so as to insert filter 31 between the output of difference network 15 and transmission circuit 16. Consequently, the residual echo at the output of difference network 15 is suppressed by filter 31 and the total echo suppression by echo canceller 30 is thereby increased.

Those skilled in the art will recognize that normally closed contact 32 can easily be provided as part of a relay R whose coil is contained within speech detector 33 and is energized in response to a speech signal on circuit 13. Although shown symbolically as a contact, however, normally closed contact 32 may also consist of an electronic switch, such as a transistor, operative in response to speech detector 33.

Figure 2:
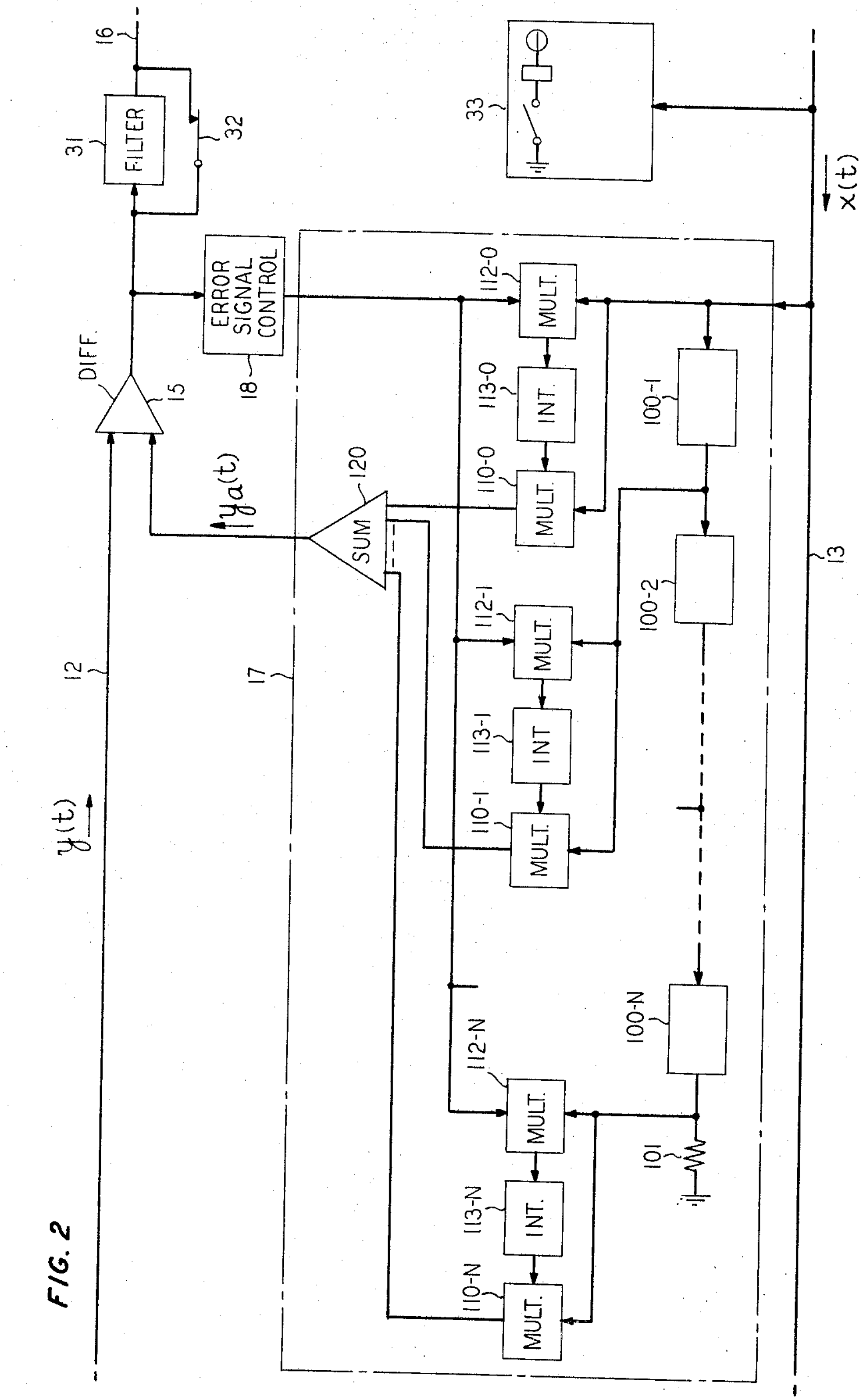
FIG. 2 is a block schematic diagram showing structural details of a portion of the system of FIG. 1.

In order to illustrate mathematically that most of the power of the residual echo is concentrated at the band edges and therefore that a filter network having attenuation only at the band edges will suppress the residual echo, a detailed discussion of the operation of the transversal filter processing network 17 will first be necessary. In FIG. 2, a schematic block diagram of echo cancelling apparatus 30 is shown with a detailed schematic block diagram of the transversal filter processing network 17.

In FIG. 2 incoming signals on circuit 13 are delivered to a transversal filter which includes a tapped delay line having delay elements 100–1 through 100–N. Delay line 100 is suitably terminated by resistor 101. Each delay element of the delay line imparts a delay of T seconds equal to the Nyquist interval of $1/2B$ where B is the bandwidth of circuit 13 in cycles per second or Hertz. In a typical example in practice, each element of the delay line imparts a one-tenth millisecond delay (T) to an applied signal. Thus, exact replicas of the signal in circuit 13 are repeatedly available at one-tenth millisecond intervals.

Individual signals produced at the taps of the delay line are adjusted in gain by means of multiplier networks 100–0 through 100–N through which they are directed, and are combined in summing network 120. Multiplier networks 110 and multiplier networks 112 (to be discussed hereinafter) are so named because circuits known to the analog computer art as four quadrant linear multipliers are used to implement these networks. Functionally, however, each of the multiplier networks 110 can be thought of as providing a changeable amount of gain (including both positive and negative gain and gain less than unity) between its respective output tap on delay line 100 and a corresponding input on summing network 120, the amount of gain presented by each of the multiplier networks 110 being directly proportional to the polarity and magnitude of the signal provided by its respective one of the integrator networks 113. Accordingly, multiplier networks 110 are also referred to hereinafter as gain control networks 110. The resultant composite signal from the output of summing network 120 is supplied to one input of difference network 15, the other input of which is supplied with signals outgoing via circuit 12. Difference network 15 effectively supplies the algebraic difference and delivers a reduced echo signal at its output.

If a static situation is postulated, i.e., one in which a steady state signal is incoming on channel 13 and the echo path is unchanging, ordinary techniques for adjusting the relative gains of control networks 110, the polarity of the signals issuing from gain control networks 110, and the number of taps employed in delay network 100 suffice to achieve a composite signal at the output of different network 15 sufficient to approximate a selected portion of the signal appearing in circuit 12. However, the situation is not a static one. The signals incoming on circuit 13 are speech signals characterized by erratic signal levels interspersed with silent intervals. Similarly, the signals in outgoing circuit 12 comprise a combination of locally generated signals, which vary considerably in magnitude and which are characterized by frequent silent intervals, together with delayed and attenuated replicas of the signal incoming on circuit 13, i.e., echo components. Accordingly, the characteristics of the transversal network must be automatically adjusted to assure that the signal developed by summing network 120 closely approximates only the echo component appearing in outgoing circuit 12.

In order to cope with the changing conditions, a closed error loop technique is employed. Thus, an initial replica signal produced by summing network 120 is subtracted via difference network 15 from the composite output signal in circuit 12. The resultant signal thus represents the locally generated output signal plus any residue echo—i.e., that portion of the echo signal not removed through the subtraction process. This composite signal constitutes an error component which is processed by error signal control 18 and delivered in parallel to multiplier networks 112–0 through 112–N. However, the error signal is not by itself suitable for indicating the necessary adjustment of the respective gain control networks 110 to obtain full correction. Accordingly, the incoming signal which appears in variously delayed versions at the junctions of delay elements 100 are mixed by multiplication with the error component in multiplier networks 112–0 through 112–N, and the resultant signal is averaged in integrating networks 113, to produce a signal whose polarity and magnitude indicate the appropriate correction for each gain control network. Thus, if the error signal indicates a substantial remanent of the echo in the outgoing transmission network, the gain control networks 110 are individually adjusted to pass a greater portion of the incoming signal on circuit 13. Hence, the composite signal developed by network 120 and removed from the outgoing signal in network 15 tends to remove the disparity and reduce the magnitude of the error signal.

Following the adjustment outlined above, it may well be that an overshoot has occurred, i.e., the replica signal subtracted from the outgoing signal was too great. This is immediately sensed by the error signal control network 18 and the gain control networks 110 are readjusted to close the gap. It has been found in pratcice that convergence toward essentially maximum echo removal can be achieved in an etxremely short time by thus adjusting the gain coefficients for each tap signal of the transversal filter in accordance with the integral of the product of the error signal and the signal appearing at the several taps of the transversal filter delay.

Let $x(t)$ represent the signal incoming via circuit 13, and let $y(t)$ represent the echo signal outgoing in circuit 12. The composite output of the transversal filter, available at the output of summing network 120, is represented by $y_a(t)$. In the absence of a locally originated signal, the signal developed at the output of difference network 15 may be represented as the error signal $e(t)=y(t)-y_a(t)$. An equilibrium, echo free, condition $(e(t)=0)$ is obtained if, and only if $y(t)=y_a(t)$ for all $x(t)$. In the above-identified article in the Bell System Technical Journal by M. M. Sondhi, it is shown that an adaptive control loop identical to the one shown in FIG. 2 does cause the processing network to adapt so that $e^2(t)$ is minimized within the capabilities of the processing network, where $e^2(t)=[y(t)-y_a(t)]^2$. If, however, the adaptive control loop is not able to converge to the point where $y(t)=y_a(t)$, then $e(t)$ will not be zero, but instead will represent a residual echo at the output of difference network 15.

Where $h(t)$ is the impulse response of the echo path through the hybrid network from circuit 13 to circuit 12, $y(t)$ may be represented by the convolution integral, $$y(t)=\int_{-\infty}^{\infty} h(\tau)\, x(t-\tau)\, d\tau \qquad (1)$$

By recognizing that both $h(t)$ and $x(t)$ are bandlimited functions and can therefore be represented by a Cardinal series (sampling theroem) representation, and that $h(t)$ is a casual function, the following representation for $y(t)$ can be derived from Equation 1:

$$y(t)=\sum_{n=0}^{\infty} Th(nT)\, x(t-nT) \qquad (2)$$

where $T=1/2B$ and B is the bandwidth.

The system of differential equations for the adaptive error control loop shown in FIG. 2 is as follows:

$$\frac{d}{dt}\vec{G}=Ke(t)\vec{X} \qquad (3)$$

where $\vec{G}$ is a vector considered as column matrix with elements O through to N, each of which represents the output signal of the integrating network 113 bearing the same dash number as the row in the matrix, $\vec{X}$ is a vector considered as a column matrix with elements 0 through to N each of which represents the output signal from the element of the tapped delay line 100 bearing the same dash number as the row of the matrix and the Oth element is the input to the delay line, $e(t)$ is the output of difference network 15, and K is the amplification constant introduced by error signal control 18. As indicated in the above-identified Bell System Technical Journal article by Sondhi, error signal control 18 may include different type functions, but for purposes of the analysis presented herein, error signal control 18 will be considered to provide only linear amplification. Similarly, the output of summation network 120 can also be represented in vector-matrix form:

$$y_a(t)=\vec{G}^T\vec{X} \qquad (4)$$

where the superscript T represents the transpose of the matrix.

Recognizing that each $x(t-nT)$ in Equation 2 is identical to the output after the $n^{th}$ section of a tapped delay line having T seconds of delay per section, Equation 2 may be rewritten in vector-matrix form:

$$y(t)=\vec{H}_1^T\vec{X}+\vec{H}_2^T\vec{Y} \qquad (5)$$

where $\vec{H}_1$ is a column matrix having the elements $Th(nT)$ from $n=0$ through to $n=N$, $\vec{H}_2$ is a column matrix having the elements $T\,h(nT)$ from $n=N+1$ through $\infty$, and $\vec{Y}$ is a column matrix having the elements $x(t-nT)$ from $n=N+1$ through to $\infty$.

Substituting Equations 4 and 5 into Equation 3 recognizing that $e(t)=y(t)-y_a(t)$, Equation 3 becomes $$\frac{d}{dt}\vec{G}=K[(\vec{H}_1^T\vec{X}+\vec{H}_2^T\vec{Y})-\vec{G}^T\vec{X}]\vec{X} \qquad (6)$$

After rearranging the vector products, $$\frac{d}{dt}\vec{G}=K[(\vec{H}_1^T-\vec{G}^T)\vec{X}\vec{X}+\vec{H}_2^T\vec{Y}\vec{X}] \qquad (7)$$

Let $\vec{R}=(\vec{H}_1-\vec{G})$. The elements of H are assumed to be fixed (or so slowly varying with time that their time derivations may be neglected). Thus $$\frac{d}{dt}\vec{H}_i=O$$

and $$\frac{d}{dt}\vec{R}=-\frac{d}{dt}\vec{G}=-K[(\vec{R}^T\vec{X}\vec{X}+\vec{H}_2^T\vec{Y}\vec{X})] \qquad (8)$$

The vector product $\vec{R}^T R$ is equal to the square of the length of the vector $\vec{R}$. Recognizing that $$\frac{d}{dt}(\vec{R}^T\vec{R})=\vec{R}^T\frac{d}{dt}\vec{R}+\left(\frac{d}{dt}\vec{R}^T\right)\vec{R}=2\vec{R}^T\frac{d}{dt}\vec{R} \qquad (9)$$

the rate of change of the vector length can be obtained by premultiplying Equation 8 by $2\vec{R}^T$ to obtain $$\frac{d}{dt}(\vec{R}^T\vec{R})=-2K[\vec{R}^T\vec{R}^T\vec{X}\vec{X}+\vec{R}^T\vec{H}_2^T\vec{Y}\vec{X}] \qquad (10)$$

Recognizing that the product of a single row matrix with a single column matrix is a scaler, Equation 10 can be rearranged to the following form:

$$\frac{d}{dt}(\vec{R}^T\vec{R})=-2K[(\vec{R}^T\vec{X})^2+(\vec{R}^T\vec{X})(\vec{H}_2^T\vec{Y})] \qquad (11)$$

$$\frac{d}{dt}(\vec{R}^T\vec{R})=-2K\vec{R}^T\vec{X}[\vec{R}^T\vec{X}+\vec{H}_2^T\vec{Y}] \qquad (12)$$

Except for the trivial case of $\vec{X}=O$, Equation 12 indicates that the length of the vector $\vec{R}$ will change until $\vec{R}=O$, that is until $\vec{G}=\vec{H}_1$. In other words, the convergence of the system is such that the output of the integrator network 113–$n$ is equal to T times the sample of the impulse function at $nT$, i.e., $$g_n=T\,h(nT) \qquad (13)$$

Accordingly, the output of summation network 120 may be rewritten as $$y_a(t)=\sum_{n=0}^{N}T\,h(nT)x(t-nt) \qquad (14)$$

Using Equation 2 for $y(t)$, the echo signal which remains at the output of difference network 15 after the adaptive error control loop has completely converged may be written as $$e(t)=\sum_{n=0}^{\infty}T\,h(nt)x(t-nT)-\sum_{n=0}^{N}T\,h(nt)x(t-nT) \qquad (15)$$

$$e(t)=\sum_{n=N+1}^{\infty}T\,h(nT)x(t-nT) \qquad (16)$$

Consequently, for any type signal $x(t)$, which is applied via circuit 13, the echo signal which remains at the output of difference network 15 is dependent on sampled values of the impulse response function, $h(t)$, at points where the independent variable $t$ is greater than NT, the total delay time of delay line 100. From Equation 16, one can think of the residual echo as resulting from passing $x(t)$ through a filter with impulse response $h_e(t)$ where $h_e(t)=0$ for $t\leq NT$ and $h_e(t)=h(t)$ for $t>NT$.

The problem of determining the spectral properties of the residual echo is thus reduced to determining the spectrum due to the truncated tail of the impulse response function $h(t)$.

The effect of a particular pole of $H(s)$, the Laplace transform of $h(t)$, on the shape of the curve of $h(t)$ is attenuated by an amount dependent on the real part of that particular pole. Accordingly, the shape of $h(t)$ for large values of $t$ is dictated primarily by those poles of $H(s)$ which lie closest to the $j\omega$ axis, and therefore the spectrum $H_e(j\omega)$, of the truncated tail of the impulse response is concentrated around those frequencies corresponding to the poles of $H(s)$ which lie closest to the $j\omega$ axis. Consider for example a network composed of K pairs of simple complex conjugate poles, $s_i=\alpha_i+j\beta_i$ and $\bar{s}_i=\alpha_i-j\beta_i$. Its impulse response is of the form, $$h(t)=\sum_{i=1}^{K}A_ie^{-\alpha_it}\sin(\beta_it+\theta_i) \qquad (17)$$

Assuming that the index $i$ orders the $\alpha_i$'s such that $\alpha_1<\alpha_2<\ldots<\alpha_K$, then for $t$ sufficiently large, for example $t>NT$, the impulse response can be approximated as $$h(t>NT)=A_1e^{-\alpha_1t}\sin(\beta_1t+\theta_1)+A_2e^{-\alpha_2t}\sin(\beta_2t+\theta_2) \qquad (18)$$

In other words, the tail of the response, $h_e(t)$, is dominated by those poles with the smallest $\alpha$. This analysis may also be carried out for poles of multiple order.

Figure 3:
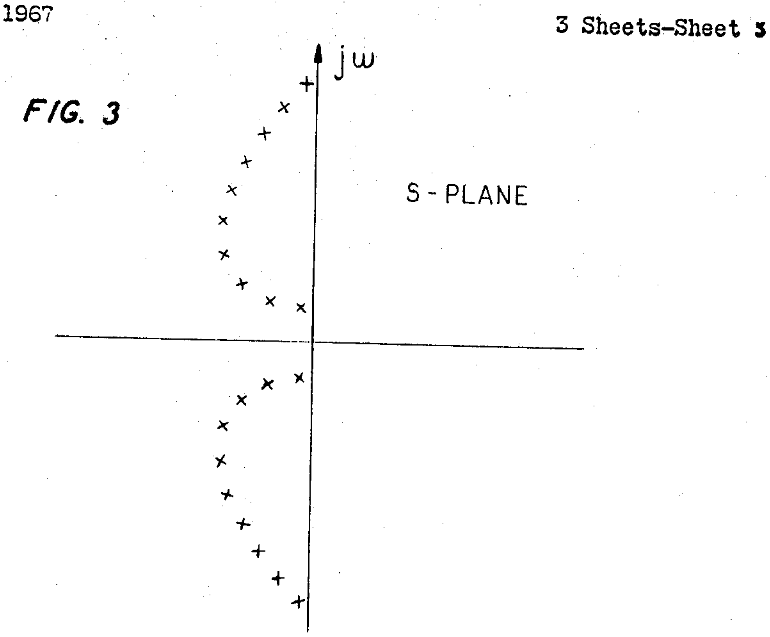
FIGS. 3 through 5 are diagrams useful in explaining the operation of the instant invention.

Echo cancelling apparatus is used in systems of the type shown in FIG. 1 wherein the echo path comprises two transmission paths, circuits 12 and 13 including amplifier 19, plus the path through the hybrid from the output of amplifier 19 to the port of hybrid 11 connected to circuit 12. Economic considerations would force placement of echo cancellers at switching offices high in the hierarchical structure rather than at the hybrids where the echoes are generated, the number of echo cancellers required in the latter case being many thousand times the number required in the former. Hence, the transmission paths, circuits 12 and 13, generally involve carrier links with their inherent bandpass filters designed to have an approximately flat passband to speech signals and a high rejection outside the passband. To achieve a flat passband characteristic, the poles for the transmission paths are situated on a curve which is concave with respect to the $j\omega$ axis as shown in FIG. 3. The hybrid path, on the other hand, consisting of two wire facilities, has relatively broadband character, and therefore has poles which are nondominant, i.e., far from the $j\omega$ axis. Hence the echo path is dominated by the transmission paths, circuits 12 and 13, and more particularly by the poles closest to the $j\omega$ axis at the edges of the passband.

Figure 4:
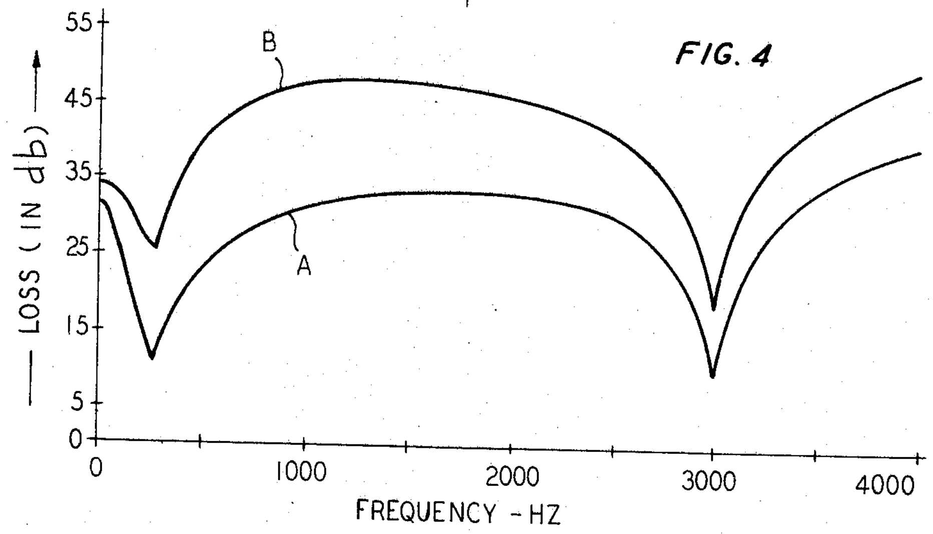

Curve A of FIG. 4 illustrates the echo path loss introduced between circuit 13 and the output of difference network 15 by an echo canceller having a delay line 100 with a total delay time of 5 milliseconds. Curve B of FIG. 4 illustrates the increased loss which is obtained by using an echo canceller having a delay line with a total delay time of 10 milliseconds. To obtain the type of improvement illustrated in going from curve A to curve B, not only requires a delay line of twice the delay time and twice the number of taps, but also requires twice the number of multipliers 110 and 112 and integrators 113 within the echo canceller. In both curves A and B of FIG. 4, a decreased loss at the band edges of 250 Hz. and 3,000 Hz. is still quite evident.

In accordance with the present invention, the performance of an echo canceller having any length of tapped delay line is markedly improved by the addition of filter network 31 to the output of difference network 15. Filter network 31 has a loss characteristic of the type shown in FIG. 5 with high attenuation at the band edges and a minimum amount of attenuation therebetween. As a result, when incoming speech is present on circuit 13, relay R within speech detector 33 is caused to operate thereby opening normally closed contact 32 and causing the residual echo signal from difference network 15 to be passed through filter network 31 within which the power of the residual echo signal is further reduced.

With no speech present on circuit 13, contact 32 remains closed and speech from the west end subscriber is permitted to pass to circuit 16 with no degradation. Even with filter network 31 inserted in the path, however, the west end subscriber is still permitted to talk with only a minimum amount of degradation introduced by virtue of the reduced bandwidth of filter network 31.

Figure 5:
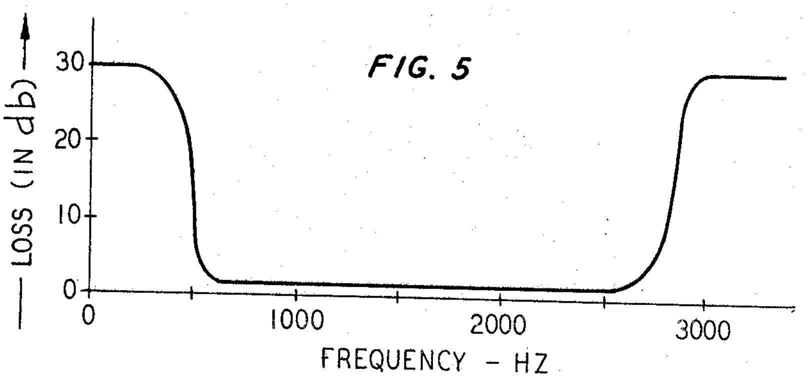

The specific amounts of attenuation and frequencies at which these attenuations occur as shown in FIG. 5 are in no way to be construed as limiting the scope of the instant invention. The specific amounts of attenuation and the precise form of the loss versus frequency characteristic for filter network 31 should be chosen after a consideration of the system requirements to be met and the echo path loss available from the echo canceller being used.

What is claimed is:

1. Apparatus for cancelling an echo produced by a signal in a band limited system, said apparatus comprising adjustable signal processing means for synthesizing an estimated echo signal in response to said echo-producing signal, means for algebraically combining said estimated echo signal with said echo signal to produce a difference signal, means responsive to said difference signal for adjusting said signal processing means, filter means having attenuation peaks at the band edges of said band limited system, and means for connecting the output of said algebraically combining means through said filter means, whereby any residual echo due to a difference between said estimated echo signal and said echo signal is suppressed.

2. Apparatus as defined in claim 1 wherein said connecting means includes a normally closed switching means for by-passing said filter means, and further includes a detector for opening said normally closed switching means in response to said echo-producing signal.

3. In combination, adaptive transversal filter means for cancelling an echo signal in a first one of two one-way transmission paths, said echo signal resulting from a signal in the second one of two one-way transmission paths, said transmission paths having frequency passband limits, filter means having attenuation peaks at the band edges of said transmission paths, and means for connecting said filter means into said one of two one-way transmission paths to the output of said echo cancelling means.

4. The combination as defined in claim 3 wherein said connecting means includes a circuit means for normally by-passing said filter means, and a detector means for opening said by-pass circuit means in response to said signal in said second one of two one-way transmission paths.

5. The combination as defined in claim 4 wherein said by-passing circut means is a normally closed contact of a relay in said detector means.

6. Echo cancelling apparatus comprising adjustable signal processing means for synthesizing a signal in response to a signal in the first of two one-way transmission paths of a communication system, means connected in the second of said two one-way paths for algebraically combining signals in said second path with the synthesized signal from said signal processing means, means responsive to the algebraically combined signal for adjusting said signal processing means, filter means having attenuation peaks at the edges of the frequency passband of said one-way transmission paths, and means for connecting the output of said alegbraically combining means through said filter means.

7. Apparatus as defined in claim 6 wherein said connecting means includes circuit means for normally by-passing said filter means and further includes detector means for opening said normally by-passing circuit means in response to said signal in the first of two one-way transmission paths.

8. Apparatus as defined in claim 7 wherein said by-passing circuit means is a normally closed contact of a relay in said detector means.

9. Echo cancelling apparatus which comprises in combination, a tapped delay line, means for supplying signals from a first of two interconnected communications circuits to said delay line, means for individually controlling the gains of signals developed at the taps of said delay line, means for algebraically combining all of said gain adjusted signals, means for differentially combining said summed signals with signals in the second of said interconnected communications circuits to produce an error signal, means for individually mixing each of said signals developed at the taps of said delay line with said error signal, integrating means for individually averaging the signals produced by said mixing means, means for utilizing said averaged signals individually for adjusting said gain controlling means, filter means having attenuation peaks at the frequency pass-band edges of said communications circuits, and means for selectively connecting signals from said differentially combining means through said filter means.

10. Apparatus as defined in claim 9 wherein said selectively connecting means includes means for normally bypassing said filter means and further includes detector means for opening said normally by-passing means in response to signals from said first of two interconnected communications circuits.

References Cited

UNITED STATES PATENTS 3,175,051 3/1965 Cutler ------------ 179—170.2

KATHLEEN CLAFFY, Primary Examiner

W. A. HELVESTINE, Assistant Examiner